(12) United States Patent
You (10) Patent No.: US 11,838,637 B2
(45) Date of Patent: Dec. 5, 2023

(54) VIDEO RECORDING METHOD AND TERMINAL

(71) Applicant: VIVO MOBILE COMMUNICATION CO., LTD., Guangdong (CN)

(72) Inventor: Honghao You, Guangdong (CN)

(73) Assignee: Vivo Mobile Communication Co., LTD., Guangdong (CN)

( * ) Notice: Subject to any disclaimer, the term of this patent is extended or adjusted under 35 U.S.C. 154(b) by 109 days.

(21) Appl. No.: 17/537,288

(22) Filed: Nov. 29, 2021

(65) Prior Publication Data

US 2022/0086357 A1 Mar. 17, 2022

Related U.S. Application Data

(63) Continuation of application No. PCT/CN2020/092380, filed on May 26, 2020.

(30) Foreign Application Priority Data

May 31, 2019 (CN) .......................... 201910470888.8

(51) Int. Cl.
*H04N 23/695* (2023.01)
*G06V 20/64* (2022.01)
*H04N 23/61* (2023.01)

(52) U.S. Cl.
CPC .......... *H04N 23/695* (2023.01); *G06V 20/64* (2022.01); *H04N 23/61* (2023.01)

(58) Field of Classification Search
CPC .... H04N 23/695; H04N 23/611; H04N 23/61; H04N 23/661; H04N 23/635; H04N 23/62; H04N 23/69; H04N 7/181; H04N 7/18; H04N 7/188; H04N 21/6587; H04N 21/2187; H04N 21/47202; G06V 20/10; G06V 20/64; G06V 20/52; G06V 20/53; G06V 20/44; G06V 10/771; G06V 10/255;
(Continued)

(56) References Cited

U.S. PATENT DOCUMENTS 8,063,945 B2 * 11/2011 Hoshino .............. H04N 23/673
348/333.03
9,479,703 B2 * 10/2016 Yu ........................ H04N 23/661
10,547,790 B2 * 1/2020 Juang .................... H04N 23/60
(Continued)

FOREIGN PATENT DOCUMENTS

CN 101981589 A 2/2011
CN 104754231 A 7/2015
(Continued)

OTHER PUBLICATIONS

Office Action issued by the Chinese Patent Office dated Jun. 24, 2020.
(Continued)

*Primary Examiner* — Pritham D Prabhakher
(74) *Attorney, Agent, or Firm* — IP & T GROUP LLP (57) ABSTRACT

A video recording method includes: receiving a first input performed by a user for N feature images; recording M target to-be-recorded objects in response to the first input, where the N feature images include the M target to-be-recorded objects; and controlling a camera to rotate, recording the M target to-be-recorded objects, and outputting a target video. M is less than or equal to N.

16 Claims, 5 Drawing Sheets

(58) Field of Classification Search
CPC ......... G01S 3/7864; G06T 7/20; G06T 7/292; G06T 2207/30232; G06F 18/2113
USPC ...................................................... 348/207.99
See application file for complete search history.

(56) References Cited

U.S. PATENT DOCUMENTS

| | | | | |
|---|---|---|---|---|
| 2005/0280707 | A1* | 12/2005 | Sablak | H04N 23/6815 |
| | | | | 348/E5.046 |
| 2008/0143866 | A1* | 6/2008 | Nakahara | H04N 23/61 |
| | | | | 348/E5.045 |
| 2009/0135269 | A1* | 5/2009 | Nozaki | H04N 23/611 |
| | | | | 348/222.1 |
| 2011/0128385 | A1* | 6/2011 | Bedros | H04N 7/181 |
| | | | | 348/240.99 |
| 2012/0257069 | A1* | 10/2012 | Alakarhu | H04N 25/75 |
| | | | | 348/208.4 |
| 2014/0176720 | A1 | 6/2014 | Anderson | |
| 2016/0094790 | A1 | 3/2016 | Yu | |
| 2017/0094184 | A1* | 3/2017 | Gao | G06T 7/337 |
| 2017/0163894 | A1* | 6/2017 | Wakamatsu | H04N 23/63 |
| 2017/0272660 | A1* | 9/2017 | Ishihara | H04N 23/632 |
| 2018/0278852 | A1 | 9/2018 | Lin | |
| 2019/0387171 | A1* | 12/2019 | Juang | H04N 23/63 |
| 2020/0162665 | A1* | 5/2020 | Szasz | H04N 23/61 |

FOREIGN PATENT DOCUMENTS

| | | |
|---|---|---|
| CN | 104902203 A | 9/2015 |
| CN | 104967803 A | 10/2015 |
| CN | 105049766 A | 11/2015 |
| CN | 107135377 A | 9/2017 |
| CN | 108028873 A | 5/2018 |
| CN | 108495045 A | 9/2018 |
| CN | 108629794 A | 10/2018 |
| CN | 108668072 A | 10/2018 |
| CN | 109120997 A | 1/2019 |
| CN | 109451245 A | 3/2019 |
| CN | 110225251 A | 9/2019 |
| KR | 10-2013-0115651 A | 10/2013 |
| WO | 2009094611 A2 | 7/2009 |
| WO | 2017048581 A1 | 3/2017 |

OTHER PUBLICATIONS

International Search Report and Written Opinion issued by the Chinese Patent Office dated Jul. 29, 2020.

\* cited by examiner

VIDEO RECORDING METHOD AND TERMINAL

CROSS-REFERENCE TO RELATED APPLICATIONS

This application is a Bypass Continuation Application of PCT/CN2020/092380 filed on May 26, 2020, which claims priority to Chinese Patent Application No. 201910470888.8 filed on May 31, 2019, which are incorporated herein by reference in their entirety.

TECHNICAL FIELD

Embodiments of the present disclosure relate to the field of communications technologies, and in particular, to a video recording method and a terminal.

BACKGROUND

With the development of terminal technologies, functions of a camera of a terminal such as a mobile phone are increasingly powerful, and more and more users prefer to use the mobile phone terminal for photographing and recording. In a process of recording a video by using the mobile phone, especially when a target object is in a moving state, the user generally needs to record the video by using the mobile phone. However, in a process in which the user holds the mobile terminal to move with the target object, movement of the mobile phone and movement of the target object may be out of synchronization, and jitter may occur when the user holds the mobile phone to move. Consequently, it is difficult to ensure quality of a recorded video.

SUMMARY

According to a first aspect, an embodiment of the present disclosure provides a video recording method, applied to a terminal including a rotatable camera, where the method includes:
  receiving a first input performed by a user for N feature images;
  recording M target to-be-recorded objects in response to the first input, where the N feature images include the M target to-be-recorded objects; and
  controlling a camera to rotate, recording the M target to-be-recorded objects, and outputting a target video; where
  M is less than or equal to N.
According to a second aspect, an embodiment of the present disclosure provides a terminal, including:
  a first receiving module, configured to receive a first input performed by a user for N feature images;
  a first recording module, configured to record M target to-be-recorded objects in response to the first input, where the N feature images include the M target to-be-recorded objects; and
  a recording and output module, configured to control a camera of the terminal to rotate, record the M target to-be-recorded objects, and output a target video; where
  M is less than or equal to N.
According to a third aspect, an embodiment of the present invention provides a terminal, including a processor, a memory, and a computer program stored in the memory and executable on the processor, and when the computer program is executed by the processor, steps of the foregoing video recording method are performed.

According to a fourth aspect, an embodiment of the present disclosure further provides a non-transitory computer-readable storage medium, where the non-transitory computer-readable storage medium stores a computer program, and when the computer program is executed by a processor, steps of the foregoing video recording method are performed.

DESCRIPTION OF EMBODIMENTS

The following clearly describes the technical solutions in the embodiments of the present disclosure with reference to the accompanying drawings in the embodiments of the present disclosure. Apparently, the described embodiments are some rather than all of the embodiments of the present disclosure. Based on the embodiments of the present disclosure, all other embodiments obtained by a person of ordinary skill in the art shall fall within the protection scope of the present disclosure.

Figure 1:
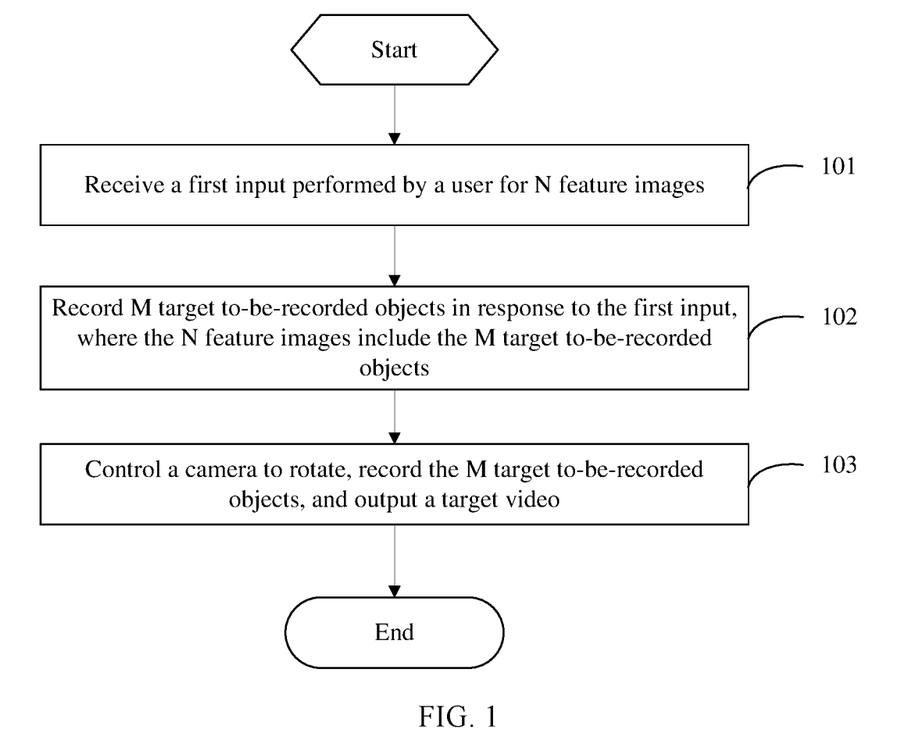
FIG. 1 is a flowchart of a video recording method according to an embodiment of the present disclosure.

FIG. 1 is a flowchart of a video recording method according to an embodiment of the present disclosure. The video recording method provided in this embodiment of the present disclosure is applied to a terminal that includes a rotatable camera. The camera may implement 360° rotation relative to a housing of the terminal, and record a video for a to-be-recorded object in a collection range by controlling the camera to rotate. As shown in FIG. 1, the video recording method provided in this embodiment of the present disclosure includes the following steps:

Step 101: Receive a first input performed by a user for N feature images.

In this step, the first input may be a tapping input, a touch and hold input, or the like of the user for a target image in the N feature images, and the first input may alternatively be a first operation.

The N feature images may be displayed on a display screen of the terminal in a layout manner such as a nine-square grid or a list.

The feature image may be an image of a feature such as an attribute, a shape, and a position of a to-be-recorded object. The to-be-recorded object may be a person, a pet, an article, or the like.

In addition, when the N feature images are displayed on the screen of the terminal in a form of a list, a feature image that is not displayed on the current display interface may be viewed in a pull-up/pull-down manner and a sliding leftward/rightward manner.

Step 102: Record M target to-be-recorded objects in response to the first input, where the N feature images include the M target to-be-recorded objects.

In this step, the first input is used to select M feature images from the N feature images, and determine to-be-recorded objects associated with the M feature images as target to-be-recorded objects; where M is less than or equal to N, and both M and N are positive integers greater than 0, so that some or all feature images may be selected from the N feature images, to determine the target to-be-recorded object.

In addition, each feature image may include feature information of only one target to-be-recorded object, or may include feature information of two or more target to-be-recorded objects. When each feature image includes feature information of two or more target to-be-recorded objects, two or more target to-be-recorded objects may be determined by selecting and determining one feature image, so that determining efficiency of the target to-be-recorded object can be improved.

For example, when the target to-be-recorded object is a person, the M feature images may be face images of the M target to-be-recorded objects.

Step 103: Control a camera to rotate, record the M target to-be-recorded objects, and output a target video.

In this step, by controlling the camera to rotate, a feature image of the target to-be-recorded object may be scanned and recognized, and after the feature image of the target to-be-recorded object is recognized, the target to-be-recorded object is recorded.

In a process of recording the M target to-be-recorded objects, one of the M target to-be-recorded objects may be recorded first. After recording, the camera is controlled to continue to rotate, and a next target to-be-recorded object is automatically scanned and recognized. When all the M target to-be-recorded objects are recorded, recording ends.

In a recording process, the terminal may be fixed to avoid a problem that a recorded picture is not clear due to jitter of a hand. In addition, by controlling the camera to rotate to scan and recognize the target to-be-recorded object, recording can be further tracked. In a process of tracking recording, a motion parameter of the target to-be-recorded object may be obtained, and the camera is controlled, based on the motion parameter, to move together with the target to-be-recorded object, so that a problem that movement of the terminal and movement of the target to-be-recorded object are not synchronized can be effectively avoided.

The target video may be a set of recorded videos of the M target to-be-recorded objects, or may be a recorded video of one or more of the M target to-be-recorded objects.

In this way, the camera is controlled to rotate, to record videos of the M target to-be-recorded objects, so that in a recording process, a user does not need to hold the terminal to move with or switch the target to-be-recorded object, thereby effectively simplifying a recording operation and improving video recording quality.

Optionally, after the recording M target to-be-recorded objects in response to the first input, and before the controlling a camera to rotate, recording the M target to-be-recorded objects, and outputting a target video, the method further includes: receiving a second input performed by a user; and recording the recording parameters of the M target to-be-recorded objects in response to the second input. The controlling a camera to rotate, recording the M target to-be-recorded objects, and outputting a target video includes: controlling the camera to rotate, recording the M target to-be-recorded objects based on the recording parameters of the M target to-be-recorded objects, and outputting the target video.

In this implementation, the second input may be an operation specified by the user, to set the recording parameters of the M target to-be-recorded objects, for example, set recording duration of the target to-be-recorded object and a recording sequence of the M target to-be-recorded objects, and recording times of the target to-be-recorded object.

The recording sequence of the M target to-be-recorded objects may be an arrangement sequence of the feature images of the M target to-be-recorded objects. For example, a target feature image in the M feature images may be dragged, to change a location of the image in the M feature images, so as to change positions of the feature images. In this way, the M feature images are sorted, and the arrangement sequence of the M feature images may be used as the recording sequence of the M target to-be-recorded objects.

In addition, when a target to-be-recorded object needs to be recorded twice or more times, a feature image of the target to-be-recorded object may be replicated, and a feature image generated after replication may be moved to a specified position. For example, if the recording sequence is BACA, a replicated feature image A moves behind a feature image C, to sort multiple to-be-recorded objects.

In an implementation of the present disclosure, when three target to-be-recorded objects in a target to-be-recorded object A, a target to-be-recorded object B, and a target to-be-recorded object C need to be recorded, where recording duration of the target to-be-recorded object A is 5 minutes, recording duration of the target to-be-recorded object B is 2 minutes, and recording duration of the target to-be-recorded object C is 7 minutes, a corresponding recording parameter may be set based on recording duration of each target to-be-recorded object. In addition, recording times and a recording sequence of each target to-be-recorded object may be further determined. For example, if the recording sequence is BACA, it may be determined that the target to-be-recorded object A is recorded twice, and recording parameters of the three target to-be-recorded objects may be set based on the recording sequence.

In a recording process in which the recording sequence is BACA, the camera is started based on the foregoing recording parameter, and the camera may rotate based on a preset rotation parameter to scan and recognize the target to-be-recorded object B. After recognizing the target to-be-recorded object B, the camera starts recording and records for 2 minutes. After completing recording of the target to-be-recorded object B, the camera is controlled to continue to scan and recognize the target to-be-recorded object A, and after the target to-be-recorded object A is recognized, recording of the target to-be-recorded object A is started, and the target to-be-recorded object A is recorded for 5 minutes. After completing recording of the target to-be-recorded object A, the camera is controlled to continue to describe and recognize the target to-be-recorded object C, and after the target to-be-recorded object C is recognized, recording is started and the target to-be-recorded object C is recorded for 7 minutes. After recording of the target to-be-recorded object C is completed, the camera is controlled to continue to scan and recognize the target to-be-recorded object A, and after the target to-be-recorded object A is recognized, recording of the target to-be-recorded object A is started, and the target to-be-recorded object A is recorded for 5 minutes. In this case, entire recording is completed.

In a recording process, if the target to-be-recorded object is in a moving state, a motion parameter of the target to-be-recorded object is obtained, and the camera moves with the target to-be-recorded object based on the motion parameter.

In addition, if the target to-be-recorded object A is in a still state throughout the recording process, when the target to-be-recorded object A is recognized, a position of the target to-be-recorded object A and a current rotation angle of the camera are obtained. When the target to-be-recorded object A needs to be recorded again, the camera may be directly rotated to a previous angle, and the target to-be-recorded object A does not need to be scanned and recognized again. In this way, scanning and recognition times of the camera can be reduced.

Optionally, the controlling a camera to rotate, recording the M target to-be-recorded objects, and outputting a target video includes: controlling the camera to rotate, and performing feature recognition in a rotation process; and when an i-th target to-be-recorded object is recognized, suspending rotation of the camera, recording a video based on a recording parameter of the i-th target to-be-recorded object, and outputting an i-th target video.

In this implementation, in a process of recording the M target to-be-recorded objects, the camera may be controlled to rotate, feature recognition is performed on the target to-be-recorded object in the rotation process, and after a feature of the target to-be-recorded object is recognized, rotation of the camera is suspended, a video is recorded based on a recording parameter (recording duration) of the target to-be-recorded object, and a recorded video of the target to-be-recorded object is output.

In a process of recording the M target to-be-recorded objects, one of the M target to-be-recorded objects may be recorded first. After recording, the camera is controlled to continue to rotate, and a next target to-be-recorded object is automatically scanned and recognized. When all the M target to-be-recorded objects are recorded, recording ends.

Optionally, the controlling a camera to rotate, recording the M target to-be-recorded objects, and outputting a target video includes: controlling the camera to rotate, and performing feature recognition in a rotation process; each time a target to-be-recorded object is recognized, suspending rotation of the camera, and recording a video based on a corresponding recording parameter to obtain T sub-videos; and performing video combination processing on at least two sub-videos in the T sub-videos, and outputting at least one target video; where M is less than or equal to T.

In this implementation, in a video recording process, a video of each target to-be-recorded object may be used as one sub-video, or multiple groups of recording parameters may be set, and one sub-video may be obtained for each recording parameter. The target video may be output by performing video combination processing on obtained sub-videos.

In a video composition processing process, video composition processing may be performed on any two sub-videos, or video composition processing may be performed on sub-videos selected by the user. The user may perform combination processing on any two or more sub-videos in T recorded sub-videos. A quantity of sub-videos on which video combination processing is performed is not limited herein.

In this way, multiple sub-videos are obtained, so that it is convenient for the user to perform video combination processing, thereby enriching a production manner of the recorded video.

Optionally, before the receiving a first input performed by a user for N feature images, the method further includes: controlling the camera to rotate, and performing feature recognition in a rotation process; and collecting one feature image each time an object meeting a preset feature is recognized, to obtain the N feature images.

In this implementation, the camera may be controlled to rotate, to collect a feature image of a to-be-recorded object. In this way, the feature is recognized, and the corresponding feature image is collected, so that information about the to-be-recorded object is collected. In addition, in the video recording process, a corresponding target to-be-recorded object may be recognized by recognizing the feature, to recognize and confirm the target to-be-recorded object.

An object that meets a preset feature may be an object at a preset position, or may be an object that includes a target feature, such as a face feature.

The feature image may include feature information such as position information and identifier information of the to-be-recorded object, and generally includes confirmation of the to-be-recorded object.

Optionally, after the collecting one feature image each time an object meeting a preset feature is recognized, to obtain the N feature images, the method further includes: displaying N floating windows, where each window includes one feature image.

In this implementation, the collected N feature images may be displayed in a form of a floating window, and each window may include one feature image, so that the user selects the M feature images from the N feature images, to determine the M target to-be-recorded objects.

Optionally, the controlling a camera to rotate, recording the M target to-be-recorded objects, and outputting a target video includes at least one of: in a process of recording an i-th target to-be-recorded object, adjusting a focal length, so that a proportion of the i-th target to-be-recorded object to a recording picture is a preset proportion; or in a process of recording an i-th target to-be-recorded object, adjusting a recording angle of the camera, so that the i-th target to-be-recorded object is located in a preset area in the recording picture.

In this implementation, in the video recording process, the focal length may be adjusted to adjust a proportion of the target to-be-recorded object to the recording picture. For example, the focal length may be adjusted to make the proportion of the target to-be-recorded object to the recording picture to be 1:3. Because the camera of the terminal provided in this embodiment of the present disclosure is rotatable, the camera may further be controlled to rotate, to adjust the recording angle of the camera, so that the target to-be-recorded object is located at a preset position on the recording picture, such as a center position or a corner position, to meet a recording requirement of the user. In addition, a user operation can be effectively simplified compared with adjusting the recording angle by holding the terminal to adjust a position of the terminal.

In this way, by adjusting the focal length and the recording angle, a recording operation of the user can be effectively enriched, and a recording effect can be improved.

Figure 2:
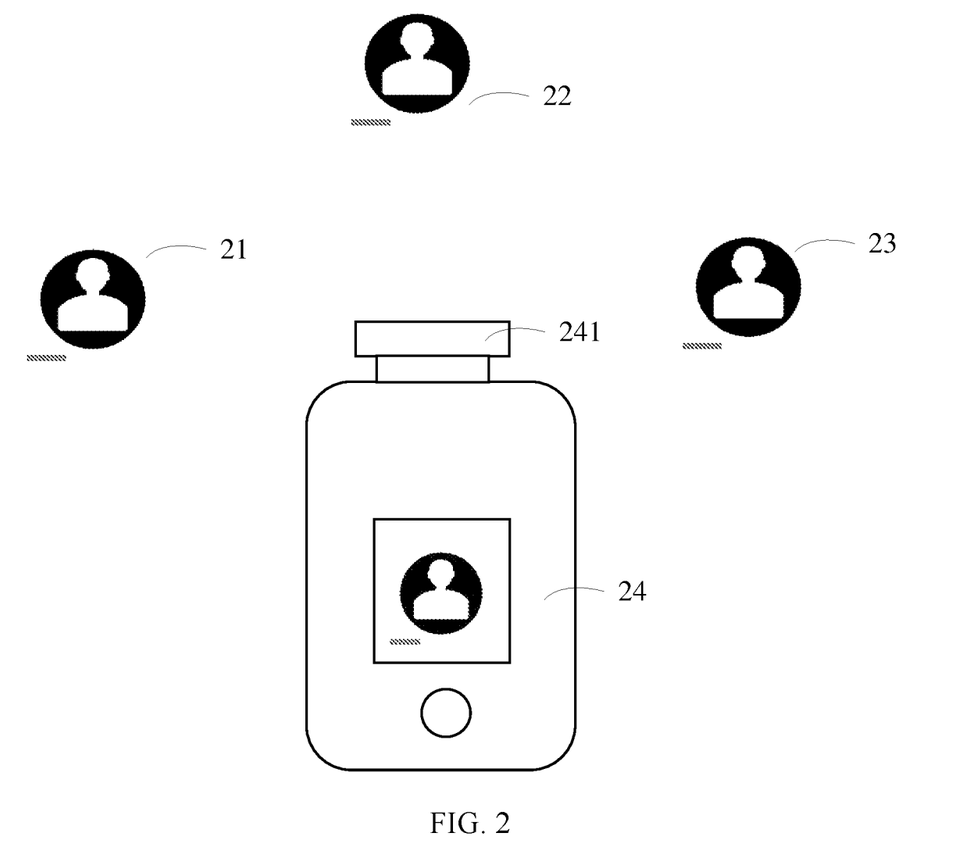
FIG. 2 is a first schematic diagram of collection of a feature image according to an embodiment of the present disclosure.

In a process of determining the feature images of the N to-be-recorded objects, the camera rotation may be controlled to rotate, to sequentially collect the feature images of the to-be-recorded objects. As shown in FIG. 2, to-be-recorded objects include a first user 21, a second user 22, and a third user 23. A camera 241 of a terminal 24 may be controlled to rotate, so that face information of the first user 21, the second user 22, and the third user 23 that surround the terminal 24 is collected, to collect feature images of the first user 21, the second user 22, and the third user 23.

Figure 3:
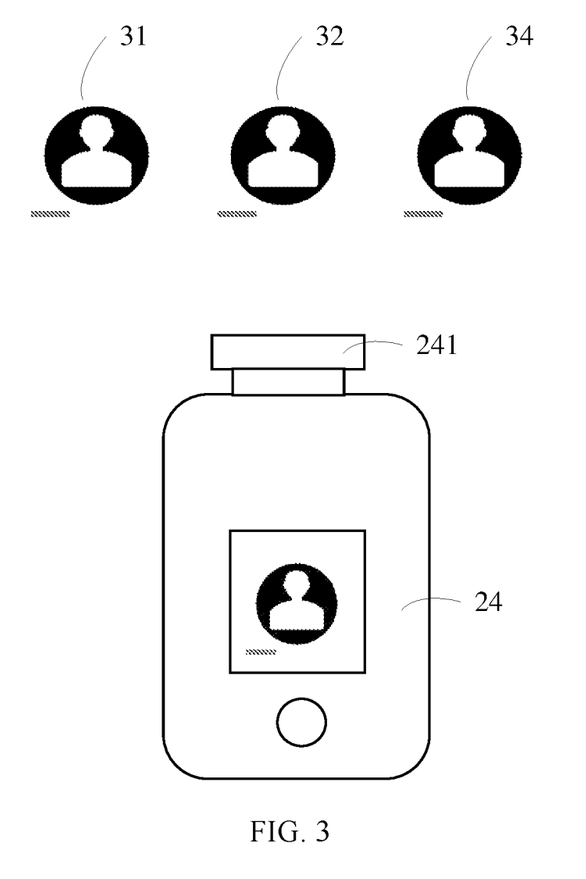
FIG. 3 is a second schematic diagram of collection of a feature image according to an embodiment of the present disclosure.

The N to-be-recorded objects may be first located straight ahead the camera, so that feature images of the N to-berecorded objects may be obtained at once. As shown in FIG. 3, to-be-recorded objects include a fourth user 31, a fifth user 32, and a sixth user 33. An image that includes face features of the fourth user 31, the fifth user 32, and the sixth user 33 may be collected by using a camera 241 of a terminal 24, to obtain feature images of the fourth user 31, the fifth user 32, and the sixth user 33 by performing photographing at one time. In this way, obtaining efficiency of the feature image can be improved.

For a photographing manner in which the feature images of the N to-be-recorded objects are simultaneously obtained by performing photographing once, photographed features of the N to-be-recorded objects are required to not block each other.

According to the video recording method in this embodiment of the present disclosure, the first input performed by the user for the N feature images is received; the M target to-be-recorded objects are recorded in response to the first input, where the N feature images include the M target to-be-recorded objects; and the camera is controlled to rotate, the M target to-be-recorded objects are recorded, and the target video is output, where M is less than or equal to N. In this way, the camera is controlled to rotate, to record videos of the M target to-be-recorded objects, so that in a recording process, the user does not need to hold the terminal to move with or switch the target to-be-recorded object, thereby effectively simplifying a recording operation and improving video recording quality.

Figure 4:
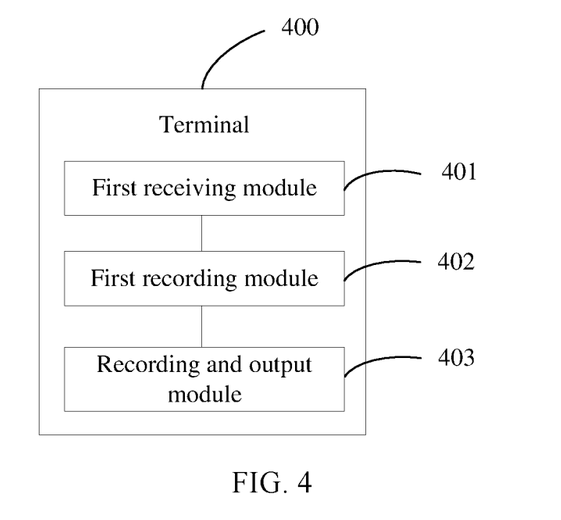
FIG. 4 is a structural diagram of a terminal according to an embodiment of the present disclosure.

FIG. 4 is a structural diagram of a terminal according to an embodiment of the present disclosure. As shown in FIG. 4, a terminal 400 includes:
- a first receiving module 401, configured to receive a first input performed by a user for N feature images;
- a first recording module 402, configured to record M target to-be-recorded objects in response to the first input, where the N feature images include the M target to-be-recorded objects; and
- a recording and output module 403, configured to control a camera of the terminal to rotate, record the M target to-be-recorded objects, and output a target video; where M is less than or equal to N.

Optionally, the terminal 400 further includes:
- a second receiving module, configured to receive a second input of a user; and
- a second recording module, configured to record the recording parameters of the M target to-be-recorded objects in response to the second input; and
- the recording and output module 403 is specifically configured to control the camera to rotate, record the M target to-be-recorded objects based on the recording parameters of the M target to-be-recorded objects, and output the target video.

Optionally, the recording parameter includes at least one of: recording duration of each target to-be-recorded object, a recording sequence of the M target to-be-recorded objects, or recording times of the M target to-be-recorded objects.

Optionally, the recording and output module 403 includes:
- a first recognition unit, configured to control the camera to rotate, and perform feature recognition in a rotation process; and
- a first recording and recognition unit, configured to when an i-th target to-be-recorded object is recognized, suspend rotation of the camera, record a video based on a recording parameter of the i-th target to-be-recorded object, and output an i-th recorded video.

Optionally, the recording and output module 403 includes:
- a first recognition unit, configured to control the camera to rotate, and perform feature recognition in a rotation process;
- a second recording and recognition unit, configured to each time a target to-be-recorded object is recognized, suspend rotation of the camera, and record a video based on a corresponding recording parameter to obtain T sub-videos; and
- a combination processing unit, configured to perform video combination processing on at least two sub-videos in the T sub-videos, and output at least one target video; where M is less than or equal to T.

Optionally, the terminal 400 further includes:
- a recognition unit, configured to control the camera to rotate, and perform feature recognition in a rotation process; and
- a collection module, configured to collect one feature image each time an object meeting a preset feature is recognized, to obtain the N feature images.

Optionally, the terminal 400 further includes:
- a display module, configured to display N floating windows, where each window includes one feature image.

Optionally, the recording and output module 403 includes:
- a first adjustment unit, configured to in a process of recording an i-th target to-be-recorded object, adjust a focal length, so that a proportion of the i-th target to-be-recorded object to a recording picture is a preset proportion; and
- a second adjustment unit, configured to in a process of recording an i-th target to-be-recorded object, adjust a recording angle of the camera, so that the i-th target to-be-recorded object is located in a preset area in the recording picture.

The terminal 400 can implement processes implemented by the terminal in the foregoing method embodiments of FIG. 1 and FIG. 3. To avoid repetition, details are not described herein again.

According to the terminal 400 in this embodiment of the present disclosure, the first input performed by the user for the N feature images is received; the M target to-be-recorded objects are recorded in response to the first input, where the N feature images include the M target to-be-recorded objects; and the camera is controlled to rotate, the M target to-be-recorded objects are recorded, and the target video is output, where M is less than or equal to N. In this way, a recording operation can be effectively simplified and video recording quality can be improved.

Figure 5:
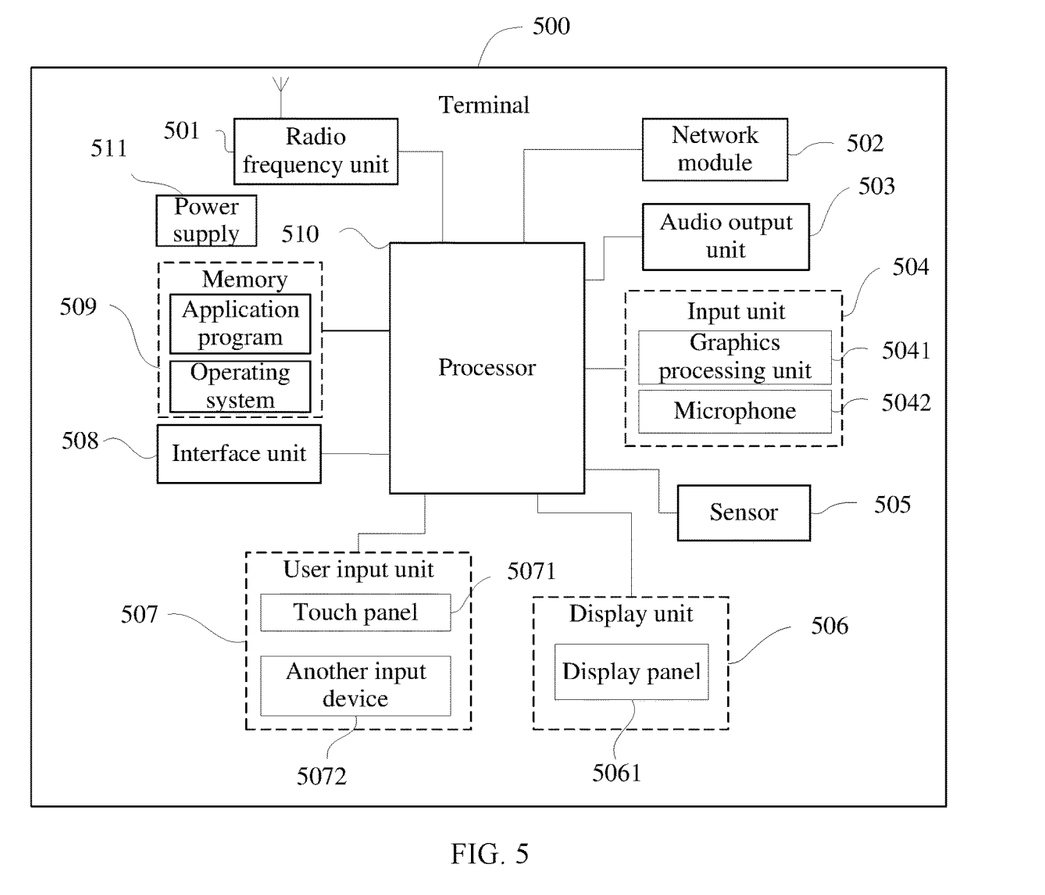
FIG. 5 is a structural diagram of another terminal according to another embodiment of the present disclosure.

FIG. 5 is a schematic diagram of a hardware structure of a terminal according to an embodiment of the present disclosure. As shown in FIG. 5, the terminal device 500 includes but is not limited to components such as a radio frequency unit 501, a network module 502, an audio output unit 503, an input unit 504, a sensor 505, a display unit 506, a user input unit 507, an interface unit 508, a memory 509, a processor 510, and a power supply 511. A person skilled in the art may understand that a structure of the terminal shown in FIG. 5 does not constitute a limitation on the terminal, and the terminal may include more or fewer components than those shown in the figure, or combine some components, or have different component arrangements. In this embodiment of the present disclosure, the terminal includes but is not limited to a mobile phone, a tablet computer, a laptop computer, a palmtop computer, an in-vehicle terminal, a wearable device, a pedometer, and the like.

The processor 510 is configured to receive a first input performed by a user for N feature images; record M target to-be-recorded objects in response to the first input, where the N feature images include the M target to-be-recorded objects; and control a camera to rotate, record the M target to-be-recorded objects, and output a target video, where M is less than or equal to N.

Optionally, the processor 510 is further configured to receive a second input of a user; record the recording parameters of the M target to-be-recorded objects in response to the second input; and control the camera to rotate, record the M target to-be-recorded objects based on the recording parameters of the M target to-be-recorded objects, and output the target video.

Optionally, the recording parameter includes at least one of: recording duration of each target to-be-recorded object, a recording sequence of the M target to-be-recorded objects, or recording times of the M target to-be-recorded objects.

Optionally, the processor 510 is further configured to control the camera to rotate, and perform feature recognition in a rotation process; and when an i-th target to-be-recorded object is recognized, suspend rotation of the camera, record a video based on a recording parameter of the i-th target to-be-recorded object, and output an i-th recorded video.

Optionally, the processor 510 is further configured to control the camera to rotate, and perform feature recognition in a rotation process; each time a target to-be-recorded object is recognized, suspend rotation of the camera, and record a video based on a corresponding recording parameter to obtain T sub-videos; and perform video combination processing on at least two sub-videos in the T sub-videos, and output at least one target video; where M is less than or equal to T.

Optionally, the camera is controlled to rotate, and feature recognition is performed in a rotation process. Each time one object that satisfies a preset feature is recognized, one feature image is collected, to obtain the N feature images.

Optionally, N floating windows are displayed, where each window includes one feature image.

Optionally, in a process of recording an i-th target to-be-recorded object, a focal length is adjusted, so that a proportion of the i-th target to-be-recorded object to a recording picture is a preset proportion; and in a process of recording an i-th target to-be-recorded object, a recording angle of the camera is adjusted, so that the i-th target to-be-recorded object is located in a preset area in the recording picture.

The terminal 500 can implement processes implemented by the terminal in the foregoing method embodiments. To avoid repetition, details are not described herein again.

According to the terminal 500 in this embodiment of the present disclosure, the first input performed by the user for the N feature images is received; the M target to-be-recorded objects are recorded in response to the first input, where the N feature images include the M target to-be-recorded objects; and the camera is controlled to rotate, the M target to-be-recorded objects are recorded, and the target video is output, where M is less than or equal to N. In this way, a recording operation can be effectively simplified and video recording quality can be improved.

It should be understood that, in this embodiment of the present disclosure, the radio frequency unit 501 may be configured to receive and send information or receive and send a signal in a call process. For example, after downlink data from a base station is received, the processor 510 processes the downlink data. In addition, uplink data is sent to the base station. Generally, the radio frequency unit 501 includes but is not limited to an antenna, at least one amplifier, a transceiver, a coupler, a low noise amplifier, a duplexer, and the like. In addition, the radio frequency unit 501 may further communicate with a network and another device by using a wireless communication system.

The terminal provides wireless broadband Internet access for the user by using the network module 502, for example, helping the user send and receive an email, browsing a web page, and accessing streaming media.

The audio output unit 503 may convert audio data received by the radio frequency unit 501 or the network module 502 or stored in the memory 509 into an audio signal and output as sound. In addition, the audio output unit 503 may further provide audio output (for example, call signal receiving sound or message receiving sound) related to a specific function performed by the terminal 500. The audio output unit 503 includes a loudspeaker, a buzzer, a telephone receiver, and the like.

The input unit 504 is configured to receive an audio or video signal. The input unit 504 may include a graphics processing unit (GPU) 5041 and a microphone 5042. The graphics processing unit 5041 processes image data of a static picture or a video obtained by an image capture apparatus (such as a camera) in a video capture mode or an image capture mode. A processed image frame may be displayed on the display unit 506. The image frame processed by the graphics processing unit 5041 may be stored in the memory 509 (or another storage medium) or sent by using the radio frequency unit 501 or the network module 502. The microphone 5042 may receive sound and can process such sound into audio data. The processed audio data may be output by being converted into a format that may be sent to a mobile communications base station by using the radio frequency unit 501 in a telephone call mode.

The terminal 500 further includes at least one sensor 505, such as an optical sensor, a motion sensor, and another sensor. For example, the optical sensor includes an ambient light sensor and a proximity sensor. The ambient light sensor may adjust luminance of the display panel 5061 based on brightness of ambient light, and the proximity sensor may disable the display panel 5061 and/or backlight when the terminal 500 approaches an ear. As a type of the motion sensor, an accelerometer sensor may detect magnitude of an acceleration in each direction (generally three axes), and may detect magnitude and a direction of gravity when being static. The accelerometer sensor may be used for recognizing a terminal gesture (for example, horizontal and vertical screen switching, a related game, or magnetometer posture calibration), a function related to vibration recognition (for example, a pedometer or a strike), or the like. The sensor 505 may further include a fingerprint sensor, a pressure sensor, an iris sensor, a molecular sensor, a gyroscope, a barometer, a hygrometer, a thermometer, an infrared sensor, and the like. This is not described herein.

The display unit 506 is configured to display information entered by the user or information provided for the user. The display unit 506 may include a display panel 5061, and the display panel 5061 may be configured in a form of a liquid crystal display (LCD), an organic light-emitting diode (OLED), or the like.

The user input unit 507 may be configured to receive input digit or character information and generate key signal input related to user setting and function control of the terminal. For example, the user input unit 507 includes a touch panel 5071 and another input device 5072. The touch panel 5071, also referred to as a touchscreen, may collect a touch operation performed by the user on or near the touch panel 5071 (for example, an operation performed by the user on or near the touch panel 5071 by using any suitable object or accessory such as a finger or a stylus). The touch panel 5071 may include two parts: a touch detection apparatus and a touch controller. The touch detection apparatus detects a touch position of the user, detects a signal brought by the touch operation, and transmits the signal to the touch controller. The touch controller receives touch information from the touch detection apparatus, converts the touch information into contact coordinates, sends the contact coordinates to the processor 510, and can receive and execute a command sent by the processor 510. In addition, the touch panel 5071 may be implemented by using multiple types such as a resistive type, a capacitive type, an infrared ray, and a surface acoustic wave. The user input unit 507 may include another input device 5072 in addition to the touch panel 5071. For example, the another input device 5072 may include but is not limited to one or more of a physical keyboard, a function key (such as a volume control key or an on/off key), a trackball, a mouse, a joystick, and the like. Details are not described herein.

Optionally, the touch panel 5071 may cover the display panel 5061. After detecting the touch operation on or near the touch panel 5071, the touch panel 5071 transmits the touch operation to the processor 510 to determine a type of a touch event, and then the processor 510 provides corresponding visual output on the display panel 5061 based on the type of the touch event. In FIG. 5, the touch panel 5071 and the display panel 5061 are used as two independent components to implement input and output functions of the terminal. However, in some embodiments, the touch panel 5071 and the display panel 5061 may be integrated to implement the input and output functions of the terminal. This is not limited herein.

The interface unit 508 is an interface connecting an external apparatus to the terminal 500. For example, the external apparatus may include a wired or wireless headset port, an external power supply (or battery charger) port, a wired or wireless data port, a storage card port, a port configured to connect to an apparatus having an identification module, an audio input/output (I/O) port, a video I/O port, a headset port, and the like. The interface unit 508 may be configured to receive input (for example, data information and power) from the external apparatus and transmit the received input to one or more elements in the terminal 500, or may be configured to transmit data between the terminal 500 and the external apparatus.

The memory 509 may be configured to store a software program and various data. The memory 509 may mainly include a program storage area and a data storage area. The program storage area may store an operating system, an application program required by at least one function (such as a sound play function or an image play function), and the like. The data storage area may store data (such as audio data or an address book) or the like created based on use of the mobile phone. In addition, the memory 509 may include a high-speed random access memory, and may further include a non-volatile memory such as at least one magnetic disk storage component, a flash memory component, or another volatile solid-state storage component.

The processor 510 is a control center of the terminal, and is connected to all parts of the entire terminal by using various interfaces and lines, and performs various functions of the terminal and processes data by running or executing the software program and/or the module that are stored in the memory 509 and invoking the data stored in the memory 509, to implement overall monitoring on the terminal. The processor 510 may include one or more processing units. Optionally, the processor 510 may be integrated with an application processor and a modem processor. The application processor mainly processes an operating system, a user interface, an application program, and the like, and the modem processor mainly processes wireless communication. It may be understood that the modem processor may also not be integrated into the processor 510.

The terminal 500 may further include the power supply 511 (such as a battery) that supplies power to each component. Optionally, the power supply 511 may be logically connected to the processor 510 by using a power management system, to implement functions such as charging, discharging, and power consumption management by using the power management system.

In addition, the terminal 500 includes some function modules not shown, and details are not described herein.

Optionally, an embodiment of the present disclosure further provides a terminal, including a processor 510, a memory 509, and a computer program stored in the memory 509 and executable on the processor 510. When the computer program is executed by the processor 510, each process of the foregoing video recording method embodiments can be implemented, and a same technical effect can be achieved. To avoid repetition, details are not described herein.

An embodiment of the present disclosure further provides a non-transitory computer-readable storage medium. A non-transitory computer program is stored in the computer-readable storage medium. When being executed by a processor, processes of the foregoing video recording method embodiments can be implemented, and a same technical effect can be achieved. To avoid repetition, details are not described herein. The non-transitory computer-readable storage medium includes a read-only memory (ROM), a random access memory (RAM), a magnetic disk, an optical disc, or the like.

It should be noted that in this specification, the term "include", "comprise", or any other variant is intended to cover non-exclusive inclusion, so that a process, method, article, or apparatus that includes a series of elements includes not only those elements but also other elements that are not explicitly listed, or includes elements inherent to such a process, method, article, or apparatus. In the absence of more restrictions, an element defined by the statement "including a . . . " does not exclude another same element in a process, method, article, or apparatus that includes the element.

According to the descriptions of the foregoing implementations, a person skilled in the art may clearly understand that the foregoing method embodiments may be implemented by using software and a required universal hardware platform, or certainly may be implemented by using hardware. However, in many cases, the former is a better implementation. Based on such an understanding, the technical solutions of the present disclosure essentially or the part contributing to related technologies may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, or a network device) to execute the methods described in the embodiments of the present disclosure.

The embodiments of the present disclosure are described with reference to the accompanying drawings above. However, the present disclosure is not limited to the foregoing specific implementations. The foregoing specific implementations are merely exemplary, but are not limiting. A person of ordinary skill in the art may make many forms without departing from the objective and the scope of the claims of the present disclosure.

What is claimed is:

1. A video recording method, applied to a terminal comprising a rotatable camera, wherein the method comprises:
   receiving a first input performed by a user for N feature images;
   determining M target to-be-recorded objects in response to the first input, wherein the N feature images comprise M feature images, and the M feature images are associated with the M target to-be-recorded objects; and
   controlling a camera to rotate, recording the M target to-be-recorded objects, and outputting a target video; wherein
   M is less than or equal to N, and both M and N are positive integers greater than 0;
   wherein after the determining M target to-be-recorded objects in response to the first input, and before the controlling a camera to rotate, recording the M target to-be-recorded objects, and outputting a target video, the method further comprises:
   receiving a second input of a user; and
   recording the recording parameters of the M target to-be-recorded objects in response to the second input; and
   the controlling a camera to rotate, recording the M target to-be-recorded objects, and outputting a target video comprises:
   controlling the camera to rotate, recording the M target to-be-recorded objects based on the recording parameters of the M target to-be-recorded objects, and outputting the target video; wherein
   the recording parameters comprise at least one of: recording duration of each target to-be-recorded object, a recording sequence of the M target to-be-recorded objects, or recording times of the M target to-be-recorded objects.

2. The method according to claim 1, the controlling a camera to rotate, recording the M target to-be-recorded objects, and outputting a target video comprises:
   controlling the camera to rotate, and performing feature recognition in a rotation process; and
   when an i-th target to-be-recorded object is recognized, suspending rotation of the camera, recording a video based on a recording parameter of the i-th target to-be-recorded object, and outputting an i-th recorded video.

3. The method according to claim 1, the controlling a camera to rotate, recording the M target to-be-recorded objects, and outputting a target video comprises:
   controlling the camera to rotate, and performing feature recognition in a rotation process;
   each time a target to-be-recorded object is recognized, suspending rotation of the camera, and recording a video based on a recording parameter corresponding to the target to-be-recorded object to obtain T sub-videos; and
   performing video combination processing on at least two sub-videos in the T sub-videos, and outputting at least one target video; wherein
   M is less than or equal to T.

4. The method according to claim 1, before the receiving a first input performed by a user for N feature images, further comprising:
   controlling the camera to rotate, and performing feature recognition in a rotation process; and
   collecting one feature image each time an object meeting a preset feature is recognized, to obtain the N feature images.

5. The method according to claim 4, after the collecting one feature image each time an object meeting a preset feature is recognized, to obtain the N feature images, further comprising:
   displaying N floating windows, wherein each window comprises one feature image.

6. The method according to claim 1, the controlling a camera to rotate, recording the M target to-be-recorded objects, and outputting a target video comprises at least one of:
   in a process of recording an i-th target to-be-recorded object, adjusting a focal length, so that a proportion of the i-th target to-be-recorded object in a recording picture is a preset proportion; or
   in a process of recording an i-th target to-be-recorded object, adjusting a recording angle of the camera, so that the i-th target to-be-recorded object is located in a preset area in the recording picture.

7. A terminal, comprising a processor, a memory, and a computer program stored in the memory and executable on the processor, wherein the computer program, when executed by the processor, causes the terminal to perform:
   receiving a first input performed by a user for N feature images;
   determining M target to-be-recorded objects in response to the first input, wherein the N feature images comprise M feature images, and the M feature images are associated with the M target to-be-recorded objects; and
   controlling a camera of the terminal to rotate, recording the M target to-be-recorded objects, and outputting a target video; wherein
   M is less than or equal to N, and both M and N are positive integers greater than 0;
   wherein the computer program, when executed by the processor, causes the terminal to further perform:
   receiving a second input of a user; and
   recording the recording parameters of the M target to-be-recorded objects in response to the second input; and
   the computer program, when executed by the processor, causes the terminal to perform:
   controlling the camera to rotate, recording the M target to-be-recorded objects based on the recording parameters of the M target to-be-recorded objects, and outputting the target video; wherein
   the recording parameters comprise at least one of: recording duration of each target to-be-recorded object, a recording sequence of the M target to-be-recorded objects, or recording times of the M target to-be-recorded objects.

8. The terminal according to claim 7, wherein the computer program, when executed by the processor, causes the terminal to perform:
   controlling the camera to rotate, and performing feature recognition in a rotation process; and
   when an i-th target to-be-recorded object is recognized, suspending rotation of the camera, recording a video based on a recording parameter of the i-th target to-be-recorded object, and outputting an i-th recorded video.

9. The terminal according to claim 7, wherein the computer program, when executed by the processor, causes the terminal to perform:
controlling the camera to rotate, and performing feature recognition in a rotation process;
each time a target to-be-recorded object is recognized, suspending rotation of the camera, and recording a video based on a recording parameter corresponding to the target to-be-recorded object to obtain T sub-videos; and
performing video combination processing on at least two sub-videos in the T sub-videos, and outputting at least one target video; wherein
M is less than or equal to T.

10. The terminal according to claim 7, wherein the computer program, when executed by the processor, causes the terminal to further perform:
controlling the camera to rotate, and performing feature recognition in a rotation process; and
collecting one feature image each time an object meeting a preset feature is recognized, to obtain the N feature images.

11. The terminal according to claim 10, wherein the computer program, when executed by the processor, causes the terminal to further perform:
displaying N floating windows, wherein each window comprises one feature image.

12. The terminal according to claim 7, wherein the computer program, when executed by the processor, causes the terminal to perform at least one of:
in a process of recording an i-th target to-be-recorded object, adjusting a focal length, so that a proportion of the i-th target to-be-recorded object in a recording picture is a preset proportion; or
in a process of recording an i-th target to-be-recorded object, adjusting a recording angle of the camera, so that the i-th target to-be-recorded object is located in a preset area in the recording picture.

13. A non-transitory computer-readable storage medium, wherein the non-transitory computer-readable storage medium stores a computer program, and the computer program, when executed by a processor, causes the processor to perform:
receiving a first input performed by a user for N feature images;
determining M target to-be-recorded objects in response to the first input,
wherein the N feature images comprise M feature images, and the M feature images are associated with the M target to-be-recorded objects; and
controlling a camera to rotate, recording the M target to-be-recorded objects, and outputting a target video; wherein
M is less than or equal to N, and both M and N are positive integers greater than 0;
wherein the computer program, when executed by the processor, causes the terminal to further perform:
receiving a second input of a user; and
recording the recording parameters of the M target to-be-recorded objects in response to the second input; and
the computer program, when executed by the processor, causes the terminal to perform:
controlling the camera to rotate, recording the M target to-be-recorded objects based on the recording parameters of the M target to-be recorded objects, and outputting the target video; wherein
the recording parameters comprise at least one of: recording duration of each target-to-be-recorded object, a recording sequence of the M target to-be-recorded objects, or recording times of the M target to-be-recorded objects.

14. The non-transitory computer-readable storage medium according to claim 13, wherein the computer program, when executed by the processor, causes the processor to perform:
controlling the camera to rotate, and performing feature recognition in a rotation process; and
when an i-th target to-be-recorded object is recognized, suspending rotation of the camera, recording a video based on a recording parameter of the i-th target to-be-recorded object, and outputting an i-th recorded video.

15. The non-transitory computer-readable storage medium according to claim 13, wherein the computer program, when executed by the processor, causes the processor to perform:
controlling the camera to rotate, and performing feature recognition in a rotation process;
each time a target to-be-recorded object is recognized, suspending rotation of the camera, and recording a video based on a recording parameter corresponding to the target to-be-recorded object to obtain T sub-videos; and
performing video combination processing on at least two sub-videos in the T sub-videos, and outputting at least one target video; wherein
M is less than or equal to T.

16. The non-transitory computer-readable storage medium according to claim 13, wherein the computer program, when executed by the processor, causes the processor to further perform:
controlling the camera to rotate, and performing feature recognition in a rotation process; and
collecting one feature image each time an object meeting a preset feature is recognized, to obtain the N feature images.

* * * * *